United States Patent [19]

Paesler et al.

[11] Patent Number: 5,204,859
[45] Date of Patent: Apr. 20, 1993

[54] METHOD AND APPARATUS FOR DETECTING A FRAME ALIGNMENT WORD IN A DATA SYSTEM

[75] Inventors: Martin R. A. Paesler; Sover W. S. Wong, both of Nottingham, England

[73] Assignee: GEC Plessey Telecommunications Limited, England

[21] Appl. No.: 654,949

[22] Filed: Feb. 13, 1991

[30] Foreign Application Priority Data

Feb. 23, 1990 [GB] United Kingdom ................. 9004188

[51] Int. Cl.⁵ ............................................. H04J 3/06
[52] U.S. Cl. .................. 370/105.1; 370/105.4
[58] Field of Search ..................... 370/105.1, 375, 91, 370/100.1, 82, 105.4

[56] References Cited

U.S. PATENT DOCUMENTS

| | | | |
|---|---|---|---|
| 4,358,845 | 11/1982 | de Passoz | 370/110.1 |
| 4,367,549 | 1/1983 | Vachee | 370/91 |
| 4,641,326 | 2/1987 | Tomisawa | 375/108 |
| 4,811,367 | 3/1989 | Tajika | 375/108 |
| 4,829,518 | 5/1989 | Iguchi | 370/100.1 |
| 4,943,985 | 7/1990 | Gherardi | 375/111 |
| 4,979,169 | 12/1990 | Almond | 370/79 |

Primary Examiner—Douglas W. Olms
Assistant Examiner—T. Samuel
Attorney, Agent, or Firm—Kirschstein, Ottinger, Israel & Schiffmiller

[57] ABSTRACT

A method and apparatus is provided for detecting a frame alignment word in a data stream. The apparatus comprises a storage circuit (9) arranged to receive a data stream and pass each bit of the data stream serially through each location of the storage circuit. A template pattern means (10), arranged to generate a template pattern, is connected to the storage circuit (9) and arranged in bit groups, each group generating an output signal when it identifies a group of bits corresponding to its template pattern. A decoder circuit (B) is arranged to receive the output signals from the groups and generate a decoder output signal when a specified number of groups match the template pattern indicating that the frame alignment word has been detected.

11 Claims, 3 Drawing Sheets

Fig.1.

| 1 | 2 | 3 | 4 | 5 | 6 | 7 | 8 |

Fig.2.

| 3 | 4 | 5 | 6 |

METHOD AND APPARATUS FOR DETECTING A FRAME ALIGNMENT WORD IN A DATA SYSTEM

BACKGROUND OF THE INVENTION

1. Field of the Invention

The present invention relates to a method and apparatus for detecting a frame alignment word in a data stream.

2. Description of Related Art

The invention finds utility in digital multiplex systems, and is generally applicable to digital communication systems where the detection of specific, recurring binary sequences is required under condition of medium to high binary error ratios.

In digital multiplex systems several independent tributary data streams are combined to a higher rate aggregate bit sequence. A specific set of characters, known as the Frame Alignment Word (FAW), is then inserted at regular intervals into the bit sequence of the aggregate signal prior to transmission. The FAW together with the subsequent bit sequence up to the start of the next FAW constitutes a digital frame.

At the demultiplexer, the received binary data is initially examined on a bit-by-bit basis until a FAW has been correctly detected. This process is known as Frame Search. When the frame search is complete a new digital frame is constructed which is a replica of the originally transmitted digital frame, the transmitted and received digital frames are then said to be in alignment. When the demultiplexer frame is in alignment the inverse of the multiplex procedures can be applied to reconstitute the original data streams.

In order to maintain correct operation of the demultiplexer it is necessary to continuously check the occurrence of a FAW in the expected position in the digital sequence to confirm that frame alignment is being maintained. When the check procedure indicates loss of alignment a new frame search is initiated.

In practical digital transmission systems binary errors cause the corruption of the FAWs resulting in failure to recognize the FAW during frame alignment procedures and spurious detection of misalignment when the digital frame is already aligned. The probability of a corrupted FAW is dependent on the binary error ratio and the number of bits which constitute the FAW. The larger the error ratio and the number of bits in the FAW the greater the probability of corruption.

In many applications the FAW is constructed to give a sufficiently long binary sequence so that the probability of its pattern being simulated by a combination of data bits within the digital frame is negligibly small. Therefore a demultiplexer can readily identify a FAW within the received signal, using a template matching technique. By this technique the incoming data stream is compared, on a bit-by-bit basis, against a template pattern of the FAW; if there is a match between the incoming stream and the template pattern, then a FAW is declared as recognized.

If the detection of the FAW is based on an exact match between the incoming data stream and the FAW template pattern, it cannot recognize valid FAWs if they have been corrupted by digital errors. Under such conditions, the demultiplexer cannot achieve rapid frame alignment or, in the case of higher error rates, may be subject to frequent spurious realignment thus greatly increasing the impairment of the received digital signal.

SUMMARY OF THE INVENTION

It is an object of the invention to significantly enhance the frame alignment performance of demultiplexers in conditions of high error rates by applying specific error tolerant FAW detection procedures.

According to the present invention there is provided apparatus for detecting a frame alignment word in a data stream, comprising a storage means arranged to receive a data stream and pass each bit of the data stream serially through each location of the storage means, template pattern means, arranged to generate a template pattern, connected to the storage means and arranged in bit groups, each group generating an output signal when it identifies a group of bits corresponding to its template pattern, a decoder circuit arranged to receive the output signals from the groups and generate a decoder output signal when a specified number of groups, which may be less than the total number in the template pattern, match the template pattern indicating that the frame alignment word has been detected.

According to the present invention there is provided, a method of detecting a frame alignment word in a data stream, comprising the steps of:

passing the data stream through each bit location of a serial storage means, checking groups of bits against a template pattern, determining when a predetermined number of groups match the template pattern, and, generating an output signal indicating that the frame alignment word has been detected.

BRIEF DESCRIPTION OF THE DRAWINGS

An embodiment of the present invention will now be described with reference to the accompanying drawing wherein:

FIG. 1 shows a FAW detection template pattern,

FIG. 2 shows a reduced FAW detection template pattern,

DETAILED DESCRIPTION OF THE PREFERRED EMBODIMENT

Figures 1, 2:
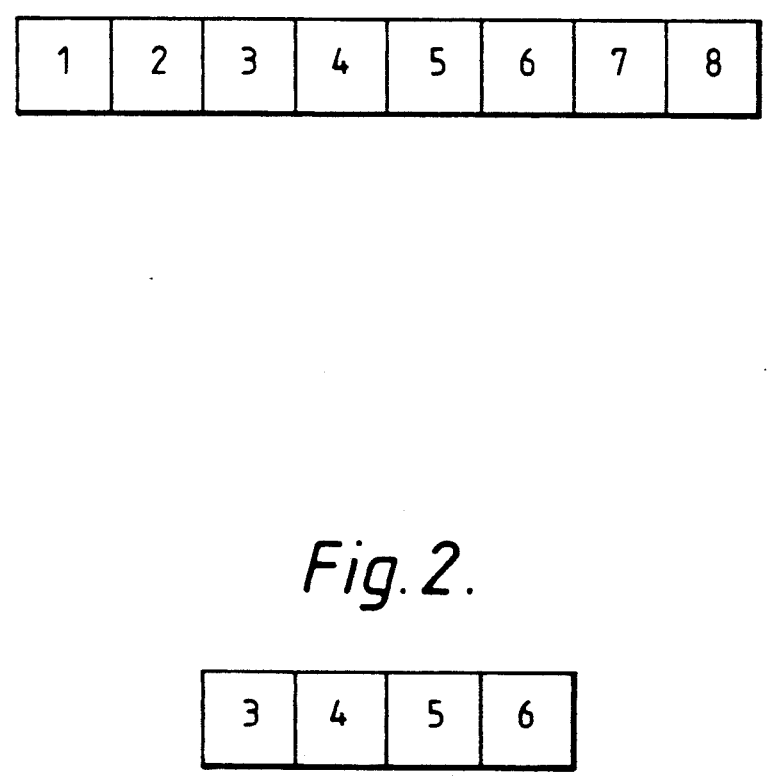

Referring to FIG. 1, a FAW detection template pattern is shown divided into groups 1 to 8.

A FAW is considered as correctly recognized and valid if any seven out of the eight groups are unambiguously detected and free of error. This FAW detection algorithm can be represented in the form of a truth table as shown in Table 1.

TABLE 1

| Groups | | | | | | | | FAW detected |
|---|---|---|---|---|---|---|---|---|
| 1 | 2 | 3 | 4 | 5 | 6 | 7 | 8 | |
| M | M | M | M | M | M | M | M | YES |
| D | M | M | M | M | M | M | M | YES |
| M | D | M | M | M | M | M | M | YES |
| M | M | D | M | M | M | M | M | YES |
| M | M | M | D | M | M | M | M | YES |
| M | M | M | M | D | M | M | M | YES |
| M | M | M | M | M | D | M | M | YES |
| M | M | M | M | M | M | D | M | YES |
| M | M | M | M | M | M | M | D | YES |

TABLE 1-continued

| Groups | | | | | | | | |
|---|---|---|---|---|---|---|---|---|
| 1 | 2 | 3 | 4 | 5 | 6 | 7 | 8 | FAW detected |
| All other combinations | | | | | | | | NO |

M = all bits matched: - group matched
D = one or more bits do not match: - group not matched When the demultiplexer has previously achieved frame alignment the FAW detection template pattern is reduced to only the middle four groups, 3, 4, 5 and 6 as shown in FIG. 2.

During the check procedure in the alignment mode the FAW is considered to be valid if any three out of four groups are unambiguously recognized and free of error. The states of groups 1, 2, 7 and 8 are not taken into account. This FAW checking algorithm can be represented in a truth table as shown in Table 2.

TABLE 2

| Groups | | | | | | | | |
|---|---|---|---|---|---|---|---|---|
| 1 | 2 | 3 | 4 | 5 | 6 | 7 | 8 | FAW detected |
| X | X | M | M | M | M | X | X | YES |
| X | X | D | M | M | M | X | X | YES |
| X | X | M | D | M | M | X | X | YES |
| X | X | M | M | D | M | X | X | YES |
| X | X | M | M | M | D | X | X | YES |
| All other combinations | | | | | | | | NO |

Figure 3:
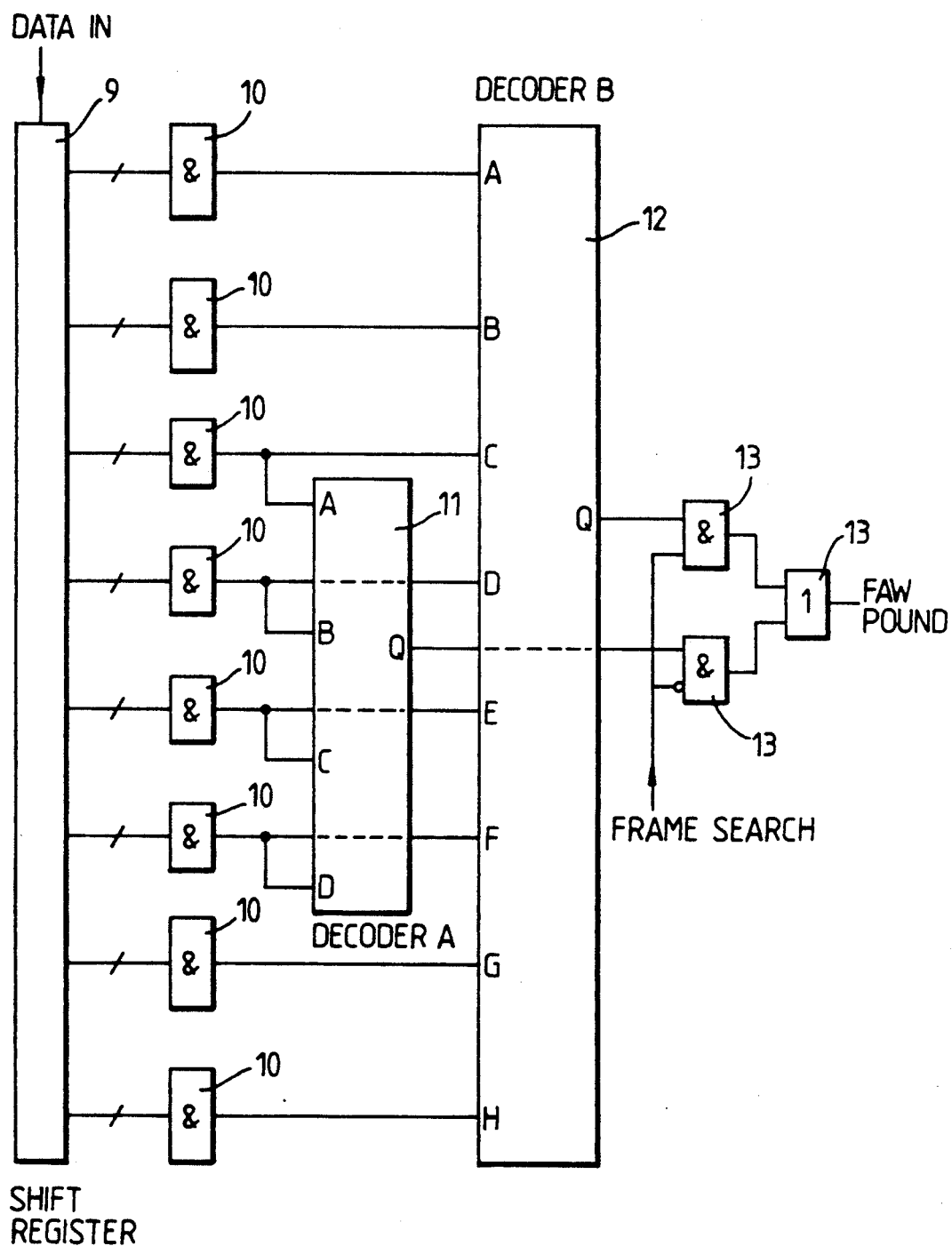
FIG. 3 shows a block diagram of the circuits which implement the invention, and, FIG. 4 shows a block circuit diagram of a decoder.

M = all bits matched: - group matched
D = one or more bits do not match: - group not matched
X = irrelevant A block schematic for a specific implementation of the present invention is shown in FIG. 3, and its operation is described as follows:

The incoming data is shifted on a bit-by-bit basis through a serial shift register 9. The contents of the shift register 9 is continuously compared with the template pattern, a preset data pattern, by eight 'AND' functions 10, where each of the 'AND' functions relates to a particular group of digits in the template pattern. When the incoming data and the corresponding group in the template pattern match the 'AND' function indicates 'TRUE'. In the Search Mode outputs of the 'AND' functions are evaluated according to the truth table as given in Table 1 by using the DECODER B 12. When a FAW has been detected 12 generates a 'TRUE' signal which is output to the FRAME SEARCH selector 13.

In the Aligned Mode the outputs of the appropriate 'AND' functions are evaluated according to the truth table as given in Table 2 by using the DECODER A 11. When a FAW has been detected 11 generates a 'TRUE' signal which is output to 13.

The output of 13 is selected according to the current state of the demultiplexer i.e. alignment or search mode.

Figure 4:
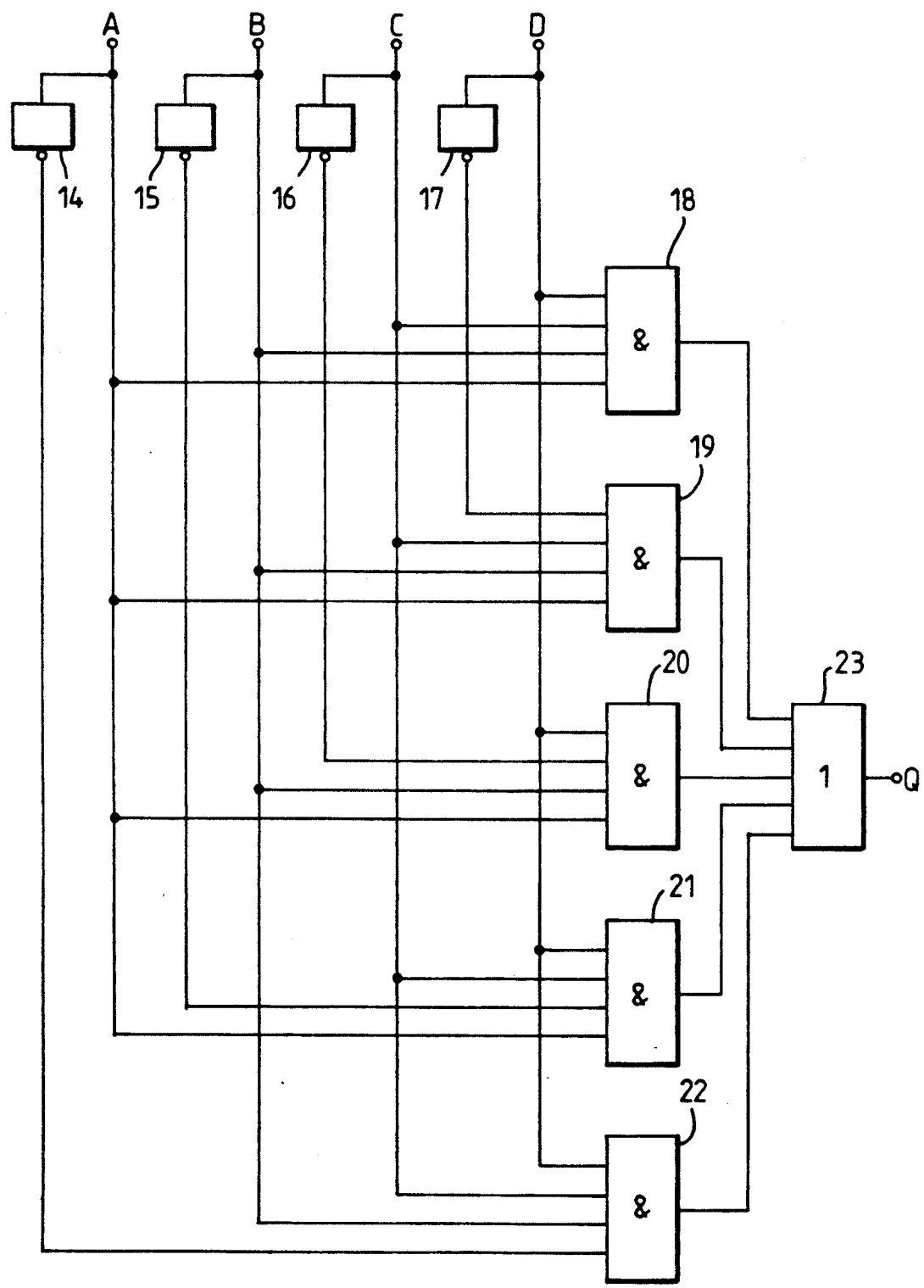

Referring to FIG. 4, a block circuit diagram is shown of the decoder A, depicted in FIG. 3. It will be appreciated that the decoder B is composed of similar elements except it will comprise eight inputs in all. The decoder A comprises four inputs A, B, C and D, each of which is directly applied to a respective AND-gate. Each input is also inverted by a respective inverter 14 to 17. Input A is applied directly to AND-gates 18 to 21, and the inverse input is applied to AND-gate 22. Input B is applied directly to AND-gates 18 to 20 and 22 and the inverse input applied to AND-gate 21. Input C is applied directly to AND-gate 18, 19, 21 and 22 and the inverse input is applied to AND-gate 20. Input D is applied to AND-gate 18, 20 to 22 and the inverse input is applied to AND-gate 19. The outputs from the AND-gates 18 to 22 are applied to an OR-gate 23 which provides the output signal Q. The truth table for decoder A is shown below:

| A | B | C | D | Q |
|---|---|---|---|---|
| 1 | 1 | 1 | 1 | 1 |
| 0 | 1 | 1 | 1 | 1 |
| 1 | 0 | 1 | 1 | 1 |
| 1 | 1 | 0 | 1 | 1 |
| 1 | 1 | 1 | 0 | 1 |
| other combinations | | | | 0 |

The truth table for decoder B is shown below:

| A | B | C | D | E | F | G | H | Q |
|---|---|---|---|---|---|---|---|---|
| 1 | 1 | 1 | 1 | 1 | 1 | 1 | 1 | 1 |
| 0 | 1 | 1 | 1 | 1 | 1 | 1 | 1 | 1 |
| 1 | 0 | 1 | 1 | 1 | 1 | 1 | 1 | 1 |
| 1 | 1 | 0 | 1 | 1 | 1 | 1 | 1 | 1 |
| 1 | 1 | 1 | 0 | 1 | 1 | 1 | 1 | 1 |
| 1 | 1 | 1 | 1 | 0 | 1 | 1 | 1 | 1 |
| 1 | 1 | 1 | 1 | 1 | 0 | 1 | 1 | 1 |
| 1 | 1 | 1 | 1 | 1 | 1 | 0 | 1 | 1 |
| 1 | 1 | 1 | 1 | 1 | 1 | 1 | 0 | 1 |
| other combinations | | | | | | | | 0 |

The above description has been of one embodiment of the present invention and is not intended to be limited thereto. It will readily be appreciated by those skilled in the art that alternative applications are possible, such as in the recognition of specific binary bit sequences required when the digital signal is subject to binary errors.

We claim:

1. Apparatus for error-tolerantly detecting a multi-bit frame alignment word in a time division multiplex data stream of bits despite corruption of the frame alignment word due to bit transmission errors, comprising:

storage means for serially receiving, storing and outputting the data stream of bits;

matching means having a preset bit pattern corresponding to the frame alignment word to be detected, said preset bit pattern being comprised of a predetermined number of groups of bits, said matching means being connected to the storage means for serially receiving and comparing the data stream of bits from the storage means with the groups of bits of the preset bit pattern, and for generating a group output signal from each group when the bits from the data stream match a respective group; and decoder means connected to the matching means for receiving each group output signal, and for generating a frame alignment signal indicative of detection of the frame alignment word when a specified number, less than said predetermined number, of groups have generated group output signals.

2. The apparatus according to claim 1, wherein the decoder means includes means for reducing said specified number after the frame alignment signal has been generated.

3. The apparatus according to claim 2, wherein the decoder means includes a first decoder circuit having a plurality of inputs corresponding in number to said predetermined number of groups, and a second decoder circuit having a plurality of inputs corresponding in number to said specified number of groups.

4. The apparatus according to claim 3, wherein the first and second decoders have decoder outputs, and wherein the decoder means includes selector means connected to the decoder outputs, for selecting an operational mode of the apparatus.

5. The apparatus according to claim 4, wherein the selector means comprises first and second AND-gates having gate outputs, and an OR-gate connected to the gate outputs; and wherein each AND-gate has a first gate input connected to a respective decoder.

6. The apparatus according to claim 5, wherein each AND-gate has a second gate input, and wherein one of the second gate inputs is an inverting input; and further comprising means for applying an enabling signal to the second gate input of each AND-gate.

7. The apparatus according to claim 1, wherein the storage means is a serial shift register having a plurality of outputs corresponding in number to said predetermined number of groups, said register having a plurality of serial storage locations through which the data stream of bits serially passes.

8. The apparatus according to claim 1, wherein the matching means includes a plurality of AND-gates corresponding in number to said predetermined number of groups.

9. The apparatus according to claim 1, wherein said specified number is one less than said predetermined number.

10. Method of error-tolerantly detecting a multi-bit frame alignment word in a time division multiplex data stream of bits despite corruption of the frame alignment word due to bit transmission errors, comprising the steps of:
   (a) serially receiving, storing and outputting the data stream of bits;
   (b) matching the data stream of bits against a preset bit pattern corresponding to the frame alignment word to be detected, said preset bit pattern being comprised of a predetermined number of groups of bits;
   (c) generating a group output signal from each group when the bits from the data stream match a respective group; and
   (d) generating a frame alignment signal indicative of detection of the frame alignment word when a specified number, less than said predetermined number, of groups have generated group output signals.

11. Method according to claim 10; further comprising the step of reducing said specified number after the frame alignment word has been generated.

* * * * *